United States Patent
Ginosatis

(10) Patent No.: US 12,472,734 B2
(45) Date of Patent: Nov. 18, 2025

(54) MULTILAYER MONOAXIALLY ORIENTED FILM

(71) Applicant: FLEXOPACK S.A., Koropi (GR)

(72) Inventor: Dimitris Ginosatis, Koropi Attica (GR)

(73) Assignee: FLEXOPACK S.A., Koropi (GR)

( * ) Notice: Subject to any disclaimer, the term of this patent is extended or adjusted under 35 U.S.C. 154(b) by 0 days.

(21) Appl. No.: 17/690,492

(22) Filed: Mar. 9, 2022

(65) Prior Publication Data
US 2022/0332100 A1    Oct. 20, 2022

(30) Foreign Application Priority Data
Mar. 9, 2021 (EP) .................................. 21161502

(51) Int. Cl.
| | |
|---|---|
| B32B 27/34 | (2006.01) |
| B32B 27/08 | (2006.01) |
| B32B 27/16 | (2006.01) |
| B32B 27/30 | (2006.01) |
| B32B 27/32 | (2006.01) |
| B32B 27/36 | (2006.01) |

(52) U.S. Cl.
CPC .............. *B32B 27/34* (2013.01); *B32B 27/08* (2013.01); *B32B 27/16* (2013.01); *B32B 27/306* (2013.01); *B32B 27/32* (2013.01); *B32B 27/327* (2013.01); *B32B 27/36* (2013.01); *B32B 2250/05* (2013.01); *B32B 2250/24* (2013.01); *B32B 2307/31* (2013.01); *B32B 2307/516* (2013.01); *B32B 2307/702* (2013.01); *B32B 2307/7244* (2013.01); *B32B 2307/736* (2013.01); *B32B 2439/70* (2013.01)

(58) Field of Classification Search
CPC ......... B32B 27/34; B32B 27/08; B32B 27/16; B32B 27/306; B32B 27/32; B32B 27/327; B32B 27/36; B32B 2250/05; B32B 2250/24; B32B 2307/31; B32B 2307/516; B32B 2307/702; B32B 2307/7244; B32B 2307/736; B32B 2439/70; B32B 27/00; B32B 2439/00; B32B 27/18; B32B 27/325; B32B 2250/03; B32B 2250/04; B32B 7/028; B32B 7/03; B32B 7/12; B32B 3/06; B32B 37/085; B32B 2305/72; B32B 2307/40
See application file for complete search history.

(56) References Cited

U.S. PATENT DOCUMENTS

| | | | |
|---|---|---|---|
| 5,184,379 A | 2/1993 | Bloo et al. | |
| 6,375,781 B1 | 4/2002 | Wojcik et al. | |
| 8,129,006 B2 | 3/2012 | Ginossatis | |
| 8,697,211 B2 | 4/2014 | Gkinosatis | |
| 9,290,320 B2 | 3/2016 | Gkinosatis | |
| 9,365,687 B2 | 6/2016 | Gkinosatis | |
| 9,440,788 B2 | 9/2016 | Gkinosatis | |
| 9,604,430 B2 | 3/2017 | Gkinosatis | |
| 9,789,669 B2 | 10/2017 | Gkinosatis | |
| 10,287,094 B2 | 5/2019 | Gkinosatis | |
| 11,511,528 B2 | 11/2022 | Ginosatis | |
| 2006/0115613 A1 | 6/2006 | Dawe et al. | |
| 2006/0233985 A1* | 10/2006 | Pockat | B32B 27/304 428/34.9 |
| 2007/0082150 A1 | 4/2007 | Ginossatis | |
| 2008/0003332 A1 | 1/2008 | Ginossatis et al. | |
| 2008/0274314 A1 | 11/2008 | Gkinosatis | |
| 2008/0274328 A1 | 11/2008 | Gkinosatis | |
| 2008/0305220 A1 | 12/2008 | Gkinosatis | |
| 2009/0176117 A1 | 7/2009 | Gkinosatis | |
| 2009/0191392 A1 | 7/2009 | Gkinosatis | |
| 2009/0196962 A1 | 8/2009 | Gkinosatis | |
| 2009/0263599 A1 | 10/2009 | Gkinosatis | |
| 2010/0028574 A1 | 2/2010 | Gkinosatis | |
| 2010/0034939 A1 | 2/2010 | Gkinosatis | |
| 2011/0039098 A1* | 2/2011 | Forloni | B32B 27/34 428/339 |
| 2011/0159263 A1 | 6/2011 | Gkinosatis | |
| 2012/0279181 A1 | 11/2012 | Gkinosatis | |
| 2013/0019568 A1 | 1/2013 | Gkinosatis | |
| 2013/0209797 A1 | 8/2013 | Gkinosatis | |
| 2013/0227916 A1 | 9/2013 | Gkinosatis | |
| 2015/0010764 A1 | 1/2015 | Gkinosatis | |
| 2015/0210454 A1 | 7/2015 | Gkinosatis | |
| 2016/0176612 A1 | 6/2016 | Ginosatis | |
| 2016/0236862 A1 | 8/2016 | Gkinosatis | |
| 2019/0193378 A1 | 6/2019 | Gkinosatis | |
| 2019/0193379 A1 | 6/2019 | Gkinosatis | |
| 2019/0241335 A1 | 8/2019 | Ginosatis | |
| 2019/0283383 A1 | 9/2019 | Ginosatis | |

(Continued)

FOREIGN PATENT DOCUMENTS

| | | | |
|---|---|---|---|
| AU | 2022201577 B2 | 11/2023 | |
| EP | 0729900 B1 | 7/2003 | |

(Continued)

OTHER PUBLICATIONS

ASTM D2732-14, 2020, Standard Test Method for Unrestrained Linear Thermal Shrinkage of Plastic Film and Sheeting, ASTM International. (Year: 2020).*

(Continued)

*Primary Examiner* — John D Freeman

(74) *Attorney, Agent, or Firm* — Jenkins, Taylor & Hunt, P.A.

(57) ABSTRACT

The present invention is directed to a monoaxially oriented multilayer film suitable for shrink lidding applications.

15 Claims, No Drawings

(56) References Cited

U.S. PATENT DOCUMENTS

| | | |
|---|---|---|
| 2020/0180284 A1 | 6/2020 | Ginosatis |
| 2021/0245478 A1 | 8/2021 | Ginosatis |
| 2022/0194062 A1 | 6/2022 | Ginosatis |
| 2023/0108826 A1 | 4/2023 | Gkinosatis |

FOREIGN PATENT DOCUMENTS

| | | | | |
|---|---|---|---|---|
| EP | 1084034 B1 * | 9/2004 | ............. | B32B 27/08 |
| EP | 2106342 | 2/2012 | | |
| EP | 4056362 A1 | 9/2022 | | |
| WO | WO 2010/015402 A1 | 2/2010 | | |
| WO | WO 2016/174219 A1 | 11/2016 | | |
| WO | WO-2019016086 A1 * | 1/2019 | ............... | A23B 4/14 |

OTHER PUBLICATIONS

European Search Report Corresponding to European Patent Application No. EP 22160708 dated Jul. 12, 2022.
Office Action received in Australian Patent Application No. 2022201577, mailed on Aug. 17, 2023, 3 pages.
Notice of acceptance in Australian Patent Application No. 2022201577, mailed on Oct. 19, 2023, 3 pages.
Office Action (Annex to the Communication) corresponding to European Patent Application No. 22160708.8 dated Sep. 6, 2024, 6 pages.
Office Action received in New Zealand Application No. 785942, mailed on Nov. 1, 2024, pp. 4.

* cited by examiner

MULTILAYER MONOAXIALLY ORIENTED FILM

CROSS-REFERENCE TO RELATED APPLICATIONS

This application claims priority to European Patent Application No. 21161502.6, filed Mar. 9, 2021, the disclosure of which is incorporated herein by reference in its entirety

TECHNICAL FIELD

The present invention is directed to a monoaxially oriented multilayer film for shrink lidding applications.

BACKGROUND

Over the previous years, the packaging method of MAP (modified atmosphere packaging) has become a standard method of packaging foods that spoil easily, such as meat products. MAP is involving the packing of foods in an atmosphere of certain gases or mixtures of gases. Each gas contributes to certain features e.g., $CO_2$ contributes to antibacterial properties and $O_2$ to color blooming of the meat.

In MAP packaging generally at least two packaging materials are implemented.
1. The tray in which the food is placed during the packing operation.
2. The top lidding film which is sealed on the tray and is hermetically closing the food pack area, separating it from the outer atmosphere. The film must contain polymers with high gas barrier in the structure, so that the gas atmosphere inside the package does not change quickly.

One particular type of a top lidding film well known in the art is the "shrinkable lidding film". This type of top lidding films that are also shrinkable, e.g., have a heat shrinkage of generally 1-30% after immersion in water at a temperature of 90° C. and an immersion time of 5 seconds. When this feature is incorporated in the top lidding film, the packs are generally tighter, which is a desirable effect for many end users of the MAP packaging.

Such films are well known in the prior art. For example, EP 0 729 900 in the name of Cryovac is describing a biaxially oriented film having low levels of heat shrinkability at both machine and transverse direction. This film is suitable as a top lidding film for MAP packaging application.

Generally, the prior art focuses on biaxially oriented multilayer films. In general, the biaxially oriented films offer excellent pack tightness, high optics and very good thermal resistance. However, the biaxial orientation process is very complicated as the selection of the polymers being able to biaxial orient needs a lot of knowledge and experimentation. The cost and size of lines for producing such films is also significant.

Monoaxial orientation (MDO) is a common method to produce oriented film. In the prior art e.g. patents EP 2 106 342, U.S. Pat. Nos. 6,375,781, 5,184,379 and others describe different films produced as per this method for a variety of applications.

The present invention is directed to a monoaxially oriented, crosslinked film having a shrinkage in the MD direction in a range from 1 to 30% measured according to ASTM D2732 by immersion in water at a temperature of 90° C. and an immersion time of 5 seconds.

This film has been proven to work effectively as a shrinkable top lidding film.

SUMMARY OF THE INVENTION

According to a first aspect the present invention provides a monoaxially oriented, crosslinked film comprising at least one oxygen barrier layer, the oxygen barrier layer comprising at least one oxygen barrier polymer, wherein the film has a shrinkage in the MD direction in a range from 1 to 30% measured according to ASTM D2732 by immersion in water at a temperature of 90° C. and an immersion time of 5 seconds.

In the film according to the first aspect the oxygen barrier polymer preferably comprises at least polyamide and/or EVOH.

The film according to the first aspect preferably has a shrinkage in the MD direction in a range from 5 to 20 measured according to ASTM D2732 by immersion in water at a temperature of 90° C. and an immersion time of 5 seconds.

The film according to the first aspect preferably comprises a first outer layer comprising ethylene alpha olefin copolymer.

The film according to the first aspect preferably comprises a second outer layer comprising at least one of the following components: ethylene alpha olefin copolymers, low density polyethylene, high density polyethylene, ionomers, thermoplastic adhesives, cyclic olefin copolymers, ethylene vinyl acetates, polyamides, polyesters and the like.

The film according to the first aspect preferably comprises in the barrier layer a blend of an amorphous polyamide with other polyamides, preferably the amorphous polyamide is used in an amount of 10-40% per mass of the polyamide blend, more preferable the amorphous polyamide is 6I/6T.

The film according to the first aspect preferably further comprises one or more adjacent layer between the first outer layer and a barrier layer and/or between the second outer layer and a barrier layer.

The film according to the first aspect preferably further comprises at least one abuse layer, wherein the abuse layer is located between a barrier layer and an adjacent layer, in direct contact with both of them.

The film according to the first aspect preferably comprises or consists of the following layers
OUTER LAYER 1/ADJACENT LAYER 1/BARRIER LAYER/ABUSE LAYER/ADJACENT LAYER 2/OUTER LAYER 2

The film according to the first aspect preferably comprises or consists of the following layers
OUTER LAYER 1/ADJACENT LAYER 1/ADJACENT LAYER 2/BARRIER LAYER/ABUSE LAYER/ADJACENT LAYER 3/ADJACENT LAYER 4/OUTER LAYER 2

The film according to the first aspect preferably comprises or consists of the following layers
OUTER LAYER 1/ADJACENT LAYER 1/ADJACENT LAYER 2/ADJACENT LAYER 3/BARRIER LAYER/ABUSE LAYER/ADJACENT LAYER 4/ADJACENT LAYER 5/OUTER LAYER 2

Each of ADJACENT LAYER 1-5 can comprise the same or different materials.

The film according to the first aspect preferably comprises an antifog compound.

According to a second aspect the present invention relates to the use of a film according to the first aspect of the invention for packaging applications, preferably for food packaging.

In one embodiment the invention relates to the use of a film according to the first aspect of the invention as top lidding film in modified atmosphere packaging (MAP) applications.

According to a third aspect the present invention relates to a pack comprising a film according to the first aspect and a tray.

According to a fourth aspect the present invention relates to a method for producing a monoaxially oriented, crosslinked film, comprising the following steps: a) Producing a film by extrusion molding; b) Quenching the film immediately after extrusion and exit of the film from the extrusion die, by cooling down the film with a high cooling rate; c) Irradiating the film by electron beam or gamma radiation after quenching; d) Orienting the film monoaxially after the irradiation step.

According to a fifth aspect the present invention relates to a monoaxially oriented, crosslinked film obtained by the method according to the fourth aspect.

Definitions

In this application the following definitions are used:

The term "film" refers to a flat or tubular flexible structure of thermoplastic material. The term "heat shrinkable" refers to a film that shrinks at least 1% in at least one of the longitudinal and transverse directions measured according to ASTM D2732 by immersion in water at a temperature of 90° C. and an immersion time of 5 seconds.

The term "total heat shrinkability" refers to the sum of heat shrinkability at the MD direction and heat shrinkability at the TD direction. In all cases, ASTM 2732 is used for measurement of shrinkability.

The term "multilayer" refers to a film comprising 2 or more layers.

The phrase "longitudinal direction" or "machine direction" herein abbreviated "MD" refers to a direction along the length of the film produced in relation to the direction of production.

The phrase "outer layer" refers to the film layer which comes in immediate contact with the outside environment (atmosphere). Therefore, the film has two outer layers. When used for packaging a product one outer layer is inside of the pack and one at the outside.

The phrase "inner layer" refers to any film layer that is not an "outer layer".

As used herein, the term "homopolymer" refers to a polymer resulting from polymerization of a single monomer.

As used herein, the term "copolymer" refers to a polymer resulting from copolymerization of at least two different polymers.

As used herein, the term "polymer" includes both above types "homopolymer" and "copolymer".

As used herein, the term "polyolefin" refers to any polymerized olefin, which can be linear, branched, cyclic, aliphatic, substituted or unsubstituted. More specifically, included in the term polyolefin are homopolymers of olefin, copolymers of olefin, copolymers of an olefin and a non-olefinic comonomer (such as ester) etc. Specific examples include polyethylene homopolymer, polypropylene homopolymer, polybutene homopolymer, ethylene alpha olefin copolymer, propylene alpha olefin copolymer, butene alpha olefin copolymer, ionomer, ethylene ester copolymer etc.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low-density polyethylene (LLDPE), medium density polyethylene (MDPE), very low-density polyethylene (VLDPE), ultra-low density polyethylene (ULDPE), metallocene catalysed polymers and polyethylene plastomers and elastomers.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer.

As used herein the phrase "ethylene vinyl acetate copolymer" or EVA refer to copolymers of ethylene and vinyl acetate.

As used herein the phrase "ethylene ester copolymer" includes any polymer made from ethylene and ester monomers. It is obvious that this term includes EVAs, EMAs and other polymers.

As used herein the term "oxygen barrier polymer" refers to polymers which have the property to limit the passage of oxygen through a film or a layer comprising the polymer. Common materials, are EVOH, PVDC or polyamide.

As used herein, the term EVOH refers to saponified products of ethylene vinyl ester copolymers. The ethylene content is typically in the range of 25 to 50% per mol. All the later references to EVOH ethylene content will be in % per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term "polyamide" refers to homopolymers and copolymers. Polyamide 6, polyamide 66, polyamide 12, polyamide 6/66, polyamide 6/12, polyamide elastomers, MXD polyamides and other copolymers are specifically useful for the invention.

As used herein the term "polyester" refers to polymers comprising terephthalate units. Examples of polyesters are PET (polyethylene terephthalate), PBT (polybutylene terephthalate), polyester elastomer (block copolymer comprising ester or ether units), PTT and other similar polymers.

As used herein, the term "ionomer" comprises the copolymers of ethylene and methacrylic or acrylic acid being metal neutralized. An example of such material is Surlyn from Dupont.

As used herein, the term "polypropylene" refers to polymers incorporating propylene structural units. Examples of these, are homo polypropylenes, random copolymers of propylene and ethylene, block copolymers of propylene and ethylene, copolymers or blends of propylene and rubber (such as blends of polypropylene and ethylene propylene rubber), propylene ethylene alpha olefin terpolymers and others. These polymers may be isotactic, syndiotactic or atactic. Isotactic is preferred.

All measurement methods mentioned herein are readily available for the skilled person. For example, they can be obtained from the American National Standards Institute at: www.webstore.ansi.org All percentages are based on weight per weight ratio, except when otherwise stated.

DETAILED DESCRIPTION

According to a first aspect the present invention provides a monoaxially oriented, crosslinked film comprising at least one oxygen barrier layer, the oxygen barrier layer comprising at least one oxygen barrier polymer, wherein the film has a shrinkage in the MD direction in a range from 1 to 30% measured according to ASTM D2732 by immersion in water at a temperature of 90° C. and an immersion time of 5 seconds.

In the film according to the first aspect the oxygen barrier polymer preferably comprises at least polyamide and/or EVOH.

The film according to the first aspect preferably has a shrinkage in the MD direction in a range from 5 to 20 measured according to ASTM D2732 by immersion in water at a temperature of 90° C. and an immersion time of 5 seconds.

The film according to the first aspect preferably comprises a first outer layer comprising ethylene alpha olefin copolymer.

The film according to the first aspect preferably comprises a second outer layer comprising at least one of the following components: ethylene alpha olefin copolymers, low density polyethylene, high density polyethylene, ionomers, thermoplastic adhesives, cyclic olefin copolymers, ethylene vinyl acetates, polyamides, polyesters and the like.

The film according to the first aspect preferably comprises in the barrier layer a blend of an amorphous polyamide with other polyamides, preferably the amorphous polyamide is used in an amount of 10-40% per mass of the polyamide blend, more preferable the amorphous polyamide is 6I/6T.

The film according to the first aspect preferably further comprises one or more adjacent layer between the first outer layer and a barrier layer and/or between the second outer layer and a barrier layer.

The film according to the first aspect preferably further comprises at least one abuse layer, wherein the abuse layer is located between a barrier layer and an adjacent layer, in direct contact with both of them.

The film according to the first aspect preferably comprises or consists of the following layers
  OUTER LAYER 1/ADJACENT LAYER 1/BARRIER LAYER/ABUSE LAYER/ADJACENT LAYER 2/OUTER LAYER 2

The film according to the first aspect preferably comprises or consists of the following layers
  OUTER LAYER 1/ADJACENT LAYER 1/ADJACENT LAYER 2/BARRIER LAYER/ABUSE LAYER/ADJACENT LAYER 3/ADJACENT LAYER 4/OUTER LAYER 2

The film according to the first aspect preferably comprises or consists of the following layers
  OUTER LAYER 1/ADJACENT LAYER 1/ADJACENT LAYER 2/ADJACENT LAYER 3/BARRIER LAYER/ABUSE LAYER/ADJACENT LAYER 4/ADJACENT LAYER 5/OUTER LAYER 2

Each of ADJACENT LAYER 1-5 can comprise the same or different materials.

The film according to the first aspect preferably comprises an antifog compound. According to a second aspect the present invention relates to the use of a film according to the first aspect of the invention for packaging applications, preferably for food packaging.

In one embodiment the invention relates to the use of a film according to the first aspect of the invention as top lidding film in modified atmosphere packaging (MAP) applications.

According to a third aspect the present invention relates to a pack comprising a film according to the first aspect and a tray.

According to a fourth aspect the present invention relates to a method for producing a monoaxially oriented, crosslinked film, comprising the following steps: a) Producing a film by extrusion molding; b) Quenching the film immediately after extrusion and exit of the film from the extrusion die, by cooling down the film with a high cooling rate; c) Irradiating the film by electron beam or gamma radiation after quenching; d) Orienting the film monoaxially after the irradiation step.

According to a fifths aspect the present invention relates to a monoaxially oriented, crosslinked film obtained by the method according to the fourth aspect.

DETAILED DESCRIPTION OF LAYERS

Barrier Layer

The barrier layer may include polymers such as polyamide, EVOH and/or polyesters, preferably polyamide and/or EVOH.

The polyamide is preferably polyamide 6, polyamide 6/66, polyamide 6/12 and/or polyamide 6/66/12.

Amorphous polyamide can also be used in a blend with other polyamides, preferably the amorphous polyamide is used in an amount of 10-40% per mass of the polyamide blend, more preferably in an amount of 15-35%, even more preferably in an amount of 20-30% per mass of the polyamide blend, most preferably in an amount of 23-27% per mass. Preferable the amorphous polyamide is of 6I/6T structure; e.g., sold from EMS under the name of Grivory G21.

The EVOH used by the invention may preferably have an ethylene content of 24 to 48% per mol.

Abuse Layer

The abuse layer may comprise materials like ethylene alpha olefin copolymers, low density polyethylene, high density polyethylenes, ionomers, thermoplastic adhesives, cyclic olefin copolymers, ethylene vinyl acetates, polyamides, polyesters and the like.

Adjacent Layer

The Adjacent layer may comprise materials like ethylene alpha olefin copolymers, low density polyethylene, high density polyethylenes, ionomers, thermoplastic adhesives, cyclic olefin copolymers, ethylene vinyl acetates, polyamides, polyesters and the like.

If adjacent and/or abuse layers are directly bonded to a barrier layer, it is important to contain at least a part of thermoplastic adhesive in order to attain a reasonable bonding to the barrier layer. A preferred type of thermoplastic adhesive is maleic anhydride grafted polyolefins, eg polyethylene and/or polypropylene.

First Outer Layer

The first outer layer comprises materials like ethylene alpha olefin copolymers, low density polyethylene, high density polyethylenes, ionomers, thermoplastic adhesives, cyclic olefin copolymers, ethylene vinyl acetates, polyamides, polyesters and the like.

Second Outer Layer (Sealing Layer)

The second outer layer 2 (also sealing layer) comprises materials like ethylene alpha olefin copolymers, low density polyethylene, high density polyethylenes, ionomers, thermoplastic adhesives, cyclic olefin copolymers, ethylene vinyl acetates, polyamides, polyesters and the like. Preferably the layer comprises ethylene alpha olefin copolymers, low density polyethylene and.or EVA.

In a preferred version of the film, the film is produced by a method incorporating high cooling speed immediately after extrusion and exit of the film from the extrusion die. Such methods are cast film produced from a longitudinal die highly air-cooled blown film produced from a tubular die water cooled blown film produced from a tubular die In general, it is preferred for the invention the film to be produced by a highly quenching (very efficient and quick cooling) process such as cast film or water-cooled blown film. This decreases the crystallinity of the film prior to orientation, making the film easier to orient as per MDO process.

The film is preferably irradiated by electron beam.

The irradiation dose is preferably at least 1 MRAD, more preferably at least 2 MRAD.

The dose is preferably up to 20 MRAD, more preferably up to 18 MRAD.

The gel content of the polyolefin version film is 1 to 60%, more preferably 3 to 50%.

The film may be irradiated prior or after the MDO orientation. Prior to MDO is preferred, as this is believed it improves the MDO orientation process.

EXAMPLES

Example 1

A 9-layer film is produced in fast quenching line (so that crystallinity is minimized as much as possible). The film structure is as follows:

| Outer layer 1 | 100% polyamide 6. |
| --- | --- |
| Adjacent layer 1 | LLDPE based tie layer |
| Adjacent layer 2 | 70% metallocene LLDPE + 30% low density polyethylene |
| Adjacent layer 3 | LLDPE based tie layer |
| Barrier Layer | EVOH 38% mol ethylene content |
| Abuse layer | 100% copolyamide 6/66 |
| Adjacent layer 4 | LLDPE based tie layer |
| Adjacent layer 5 | 70% metallocene LLDPE + 30% low density polyethylene |
| Outer layer 2 | (sealing layer) 70% metallocene LLDPE + 20% low density polyethylene + 10% antifog masterbatch |

The thicknesses of the different layers are from outer layer 1 to outer (sealing) layer 2 as follows:

20/5/5/5/8/10/10/10/27

Example 2

A 9-layer film is produced as in Example 1. The film structure is as follows:

| Outer layer 1 | 70% metallocene LLDPE + 30% low density polyethylene |
| --- | --- |
| Adjacent layer 1 | 70% metallocene LLDPE + 30% low density polyethylene |
| Adjacent layer 2 | LLDPE based tie layer |
| Adjacent layer 3 | 100% copolyamide 6/66 |
| Barrier Layer | EVOH 38% mol ethylene content |
| Abuse layer | 100% copolyamide 6/66 |
| Adjacent layer 4 | LLDPE based tie layer |
| Adjacent layer 5 | 70% metallocene LLDPE + 30% low density polyethylene |
| Outer layer 2 | (Sealing layer) 70% metallocene LLDPE + 20% low density polyethylene + 10% antifog masterbatch |

Thickness of different layers are as follows
20/5/5/5/8/10/10/10/27

Example 3

A further example was produced as follows

| Outer layer 1 | 70% metallocene LLDPE + 30% low density polyethylene |
| --- | --- |
| Adjacent layer 1 | 70% metallocene LLDPE + 30% low density polyethylene |
| Adjacent layer 2 | 70% metallocene LLDPE + 30% low density polyethylene |
| Adjacent layer 3 | LLDPE based tie layer |
| Barrier Layer | EVOH 44% mol ethylene content |
| Abuse layer | LLDPE based tie layer |
| Adjacent layer 4 | 70% metallocene LLDPE + 30% low density polyethylene |
| Adjacent layer 5 | 70% metallocene LLDPE + 30% low density polyethylene |
| Outer layer 2 | (Sealing layer) 70% metallocene LLDPE + 30% low density polyethylene |

Thickness of different layers are as follows
20/5/5/5/8/10/10/10/27

Crosslinking by Electron Beam

The three films according to examples 1, 2, and 3 were afterwards crosslinked by electron beam irradiation at a level of 6 Mrads.

Gel Content

The gel content of the materials was calculated as follows:

The non-polyethylene layers were dissolved in keeping the film in formic acid under ambient conditions for 24 hours. Then the film was left to cool and dried at 40° C. for 10 hours.

Then the gel content of the polyethylene (or more general polyolefin) part of the multilayer film was measured following the method of ASTM D 2765.

In case the film comprises other polyolefin, non-polyethylene materials like polypropylene or cyclic olefin copolymers, the measurement of the gel content is done according to ASTM D2765 as well.

TABLE 1

| FILM | GEL CONTENT % of polyolefin part of the film |
| --- | --- |
| 1 | 4 |
| 2 | 6 |
| 3 | 6 |

Monoaxial Orientation

The films were subsequently monoaxially oriented in a commercial MDO line, comprising totally 12 rollers of which 4 consist the stretching until and the rest are preheating, annealing and cooling rollers.

The temperature of the stretching rollers was set to 95-110° C. while the stretch ratio (ratio of the initial film thickness divided by the total film thickness) was 4. Thus, the thickness of the final films produced was 25 microns, which is a typical thickness for shrinkable lidding films.

In order to retain an appropriate level of shrinkage, the temperature of the annealing rollers was kept at a temperature of less than the stretching rollers and also less than 90° C. So, the temperature of the annealing rollers was 85° C.

TABLE 2

| FILM | HAZE ASTM D1003 | SHRINKAGE AT MD (ASTM D2732, 90° C., 5 seconds) | MD orientation process |
|---|---|---|---|
| 1 | 4.7 | 15 | stable |
| 2 | 5.5 | 14 | stable |
| 3 | 5.6 | 11 | stable |

Antifog

In many MAP applications of wet products, it is necessary to add antifog to the film to allow for visibility of the contents. The antifog can be added as a masterbatch during extrusion, probably in the second outer (sealing) layer (see examples 1, 2) or in a separate coating step. This was done with film 3 where the antifog was added at subsequent coating step. The surface coated is the surface of the film to be in contact with the food packed.

Well known antifog substances are glycerol esters, polyglycerol esters, ethoxylated sorbitan esters, sorbitan esters of fatty acids and other substances as well known in the art.

The antifog coating can be done by well-known processes in the art such as spray coating, roller coating, gravure coating, flexographic coating or others.

Suitability as Shrinkable Top Lidding Film

The three films were tested as per their suitability as top lidding films.

The test was done at a customer packing in a Multivac T300 tray sealer. As a known film a biaxially oriented film comprising polyethylene, polyamide and EVOH was used.

Comparative Example

Films 1, 2, 3 were tested against the known film, which was a biaxially oriented film heat shrinkable in both MD and TD directions. The test showed practically no difference in the pack tightness. Surprisingly, it was noticed that the monoaxial films of the invention showed better processability during operation. The known film was more difficult to cut causing a lot of process interruptions.

What is claimed is:

1. A monoaxially oriented, crosslinked film consisting of:
   a first outer layer;
   a second outer layer;
   an oxygen barrier layer, wherein the oxygen barrier layer consists of polyamide and/or EVOH;
   adjacent layers between the first outer layer and the oxygen barrier layer and between the second outer layer and the oxygen barrier layer, wherein each of the adjacent layers consists of one or more materials selected from the group consisting of an ethylene alpha olefin copolymer, a low density polyethylene, a high density polyethylene, an ionomer, a maleic anhydride grafted polyethylene, a maleic anhydride grafted polypropylene, an ethylene vinyl acetate, a polyamide, and a polyester; and
   an abuse layer, wherein the abuse layer is located between and in direct contact with both the oxygen barrier layer and an adjacent layer, wherein the abuse layer consists of an ethylene alpha olefin copolymer, a low density polyethylene, a high density polyethylene, an ionomer, a maleic anhydride grafted polyethylene, a maleic anhydride grafted polypropylene, an ethylene vinyl acetate, a polyamide, and a polyester;
   wherein the film has a shrinkage in the MD direction in a range from 1 to 30% measured according to ASTM D2732 by immersion in water at a temperature of 90° C. and an immersion time of 5 seconds; and wherein the film consists of the following layers:
   OUTER LAYER 1/ADJACENT LAYER 1/ADJACENT LAYER 2/ADJACENT LAYER 3/OXYGEN BARRIER LAYER/ABUSE LAYER/ADJACENT LAYER 4/ADJACENT LAYER 5/OUTER LAYER 2.

2. The film according to claim 1, wherein the oxygen barrier layer consists of EVOH.

3. The film according to claim 1, wherein the film has a shrinkage in the MD direction in a range from 5 to 20% measured according to ASTM D2732 by immersion in water at a temperature of 90° C. and an immersion time of 5 seconds.

4. The film according to claim 1, wherein the first outer layer comprises a component selected from the group consisting of ethylene alpha olefin copolymers, low density polyethylene, high density polyethylene, ionomers, thermoplastic adhesives, cyclic olefin copolymers, ethylene vinyl acetates, polyamides, and polyesters.

5. The film according to claim 1, wherein the second outer layer comprises at least one component selected from the group consisting of ethylene alpha olefin copolymers, low density polyethylene, high density polyethylene, ionomers, thermoplastic adhesives, cyclic olefin copolymers, ethylene vinyl acetates, polyamides, and polyesters.

6. The film according to claim 1, wherein the oxygen barrier layer consists of a blend of an amorphous polyamide with one or more other polyamides.

7. The film according to claim 1, wherein the first outer layer and the second outer layer independently comprise a component selected from the group consisting of ethylene alpha olefin copolymers, low density polyethylene, high density polyethylene, ionomers, thermoplastic adhesives, cyclic olefin copolymers, ethylene vinyl acetates, polyamides, and polyesters.

8. The film according to claim 1, wherein the film comprises an antifog compound.

9. A method for modified atmosphere packaging (MAP), the method comprising sealing a food item in a package, the package comprising a tray on which the food is placed and a top lidding film, wherein the top lidding film comprises the monoaxially oriented, crosslinked film of claim 1.

10. A pack comprising a film according to claim 1 and a tray.

11. The film according to claim 4, wherein the first outer layer comprises an ethylene alpha olefin copolymer.

12. The film according to claim 6, wherein the amorphous polyamide is present in the oxygen barrier layer in an amount of 10-40% per mass of the polyamide blend.

13. The film according to claim 6, wherein the amorphous polyamide is 6I/6T.

14. The film according to claim 1, wherein each of the adjacent layers consist of (i) polyamide, (ii) linear low density polyethylene (LLDPE), or (iii) LLDPE and low density polyethylene; and wherein the abuse layer consists of a polyamide or LLDPE.

15. The film according to claim 14, wherein each of the adjacent layers consists of LLDPE or LLDPE and low density polyethylene.

\* \* \* \* \*